US012744581B2

(12) United States Patent
Barbu et al.

(10) Patent No.: US 12,744,581 B2
(45) Date of Patent: Sep. 22, 2026

(54) METHOD, APPARATUS AND COMPUTER PROGRAM

(71) Applicant: Nokia Technologies Oy, Espoo (FI)

(72) Inventors: Oana-Elena Barbu, Aalborg (DK); Benny Vejlgaard, Gistrup (DK); Johannes Harrebek, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 397 days.

(21) Appl. No.: 18/484,889

(22) Filed: Oct. 11, 2023

(65) Prior Publication Data

US 2024/0129018 A1 Apr. 18, 2024

(30) Foreign Application Priority Data

Oct. 13, 2022 (EP) .................................... 22201301

(51) Int. Cl.
*H04B 7/145* (2006.01)
*H04B 1/10* (2006.01)

(52) U.S. Cl.
CPC ............... *H04B 7/145* (2013.01); *H04B 1/10* (2013.01)

(58) Field of Classification Search
CPC . H04B 7/145; H04B 1/10; H04B 5/77; H04B 7/15564; H04B 7/15592; H04B 15/00; H04B 1/109; H04B 1/7115; H04B 2001/71077; H04B 1/1081; H04B 1/71072; H04B 1/7107; G06K 7/10009; H04L 25/0202; H04L 1/0048; H04L 25/0204; H04L 1/0026; H04W 52/243; H04W 24/00
See application file for complete search history.

(56) References Cited

U.S. PATENT DOCUMENTS

2015/0318881 A1* 11/2015 Barott ...................... H04B 1/10
2016/0094933 A1* 3/2016 Deyle ...................... H04B 5/77
455/269
2016/0241348 A1 8/2016 Zirwas et al.
(Continued)

FOREIGN PATENT DOCUMENTS

WO WO 2019/190903 A1 10/2019
WO 2020/131813 A1 6/2020
(Continued)

OTHER PUBLICATIONS

Decarli, N. et al., "Passive UWB RFID for Tag Localization: Architectures and Design," IEEE Sensors Journal, vol. 16, No. 5, Mar. 1, 2016, pp. 1385-1397.
(Continued)

*Primary Examiner* — Lana N Le
(74) *Attorney, Agent, or Firm* — Barta Jones, PLLC

(57) ABSTRACT

There is provided an apparatus including receiving, at a second node, a signal including contributions of at least one backscatter signal and at least one further signal, the at least one backscatter signal being transmitted by a respective at least one passive device in response to a first node transmitting a first signal to the at least one passive device; isolating the contribution of the at least one backscatter signal from the at least one further signal; and based on the contribution of the at least one backscatter signal, determining, by the second node, one or more parameters associated with the respective at least one passive device.

11 Claims, 4 Drawing Sheets

(56) References Cited

U.S. PATENT DOCUMENTS

| | | | | |
|---|---|---|---|---|
| 2018/0049126 | A1 | 2/2018 | Cheng | |
| 2019/0173543 | A1 | 6/2019 | Ganesan et al. | |
| 2019/0341994 | A1* | 11/2019 | Ma | H04B 7/145 |
| 2020/0313739 | A1* | 10/2020 | Mitsugi | G06K 7/10009 |
| 2020/0314752 | A1 | 10/2020 | Haque et al. | |
| 2020/0412591 | A1 | 12/2020 | Lopez et al. | |
| 2021/0126359 | A1* | 4/2021 | Kim | H04B 7/145 |
| 2023/0244883 | A1* | 8/2023 | Nielsen | H04B 5/77 |
| 2025/0052880 | A1* | 2/2025 | Kimionis | H04B 7/15592 |

FOREIGN PATENT DOCUMENTS

| | | | |
|---|---|---|---|
| WO | 2021/160023 | A1 | 8/2021 |
| WO | 2023/225817 | A1 | 11/2023 |
| WO | 2024/012678 | A1 | 1/2024 |

OTHER PUBLICATIONS

"3rd Generation Partnership Project; Technical Specification Group Radio Access Network; NR; Physical channels and modulation (Release 17)", 3GPP TS 38.211, V17.0.0, Dec. 2021, pp. 1-134.

"3rd Generation Partnership Project; Technical Specification Group Radio Access Network; NR; Physical layer procedures for data (Release 17)", 3GPP TS 38.214, V17.0.0, Dec. 2021, pp. 1-217.

"3rd Generation Partnership Project; Technical Specification Group Radio Access Network; NR; Physical layer procedures for control (Release 17)", 3GPP TS 38.213, V17.0.0, Dec. 2021, pp. 1-225.

"Moderator's summary of Discussion [RAN94e-R18Prep-28] Passive IoT", 3GPP TSG RAN#94e, RP-212688, Agenda: 8A.5, Ericsson, Dec. 6-17, 2021, pp. 1-45.

Lin et al., "Battery-Less IoT Sensor Node with PLL-Less WiFi Backscattering Communications in a 2.5-μW Peak Power Envelope", Symposium on VLSI Circuits, Jun. 13-19, 2021, pp. 1-2.

Chen et al., "Reliable and Practical Bluetooth Backscatter With Commodity Devices", IEEE/ACM Transactions on Networking, vol. 24, No. 04, Aug. 2021, pp. 1717-1729.

Lyu et al., "A UHF/UWB Hybrid RFID Tag With a 51-m Energy-Harvesting Sensitivity for Remote Vital-Sign Monitoring", IEEE Transactions on Microwave Theory and Techniques, vol. 68, No. 11, Nov. 2020, pp. 4886-4895.

Tang et al., "Self-sustainable Long Range Backscattering Communication Using RF Energy Harvesting", IEEE Internet of Things Journal, vol. 08, No. 17, Sep. 2021, pp. 13737-13749.

"Enhanced Positioning Concept Document Passive IoT Positioning", Nokia, V0.1, Nov. 2021, 37 pages.

"Passive IoT study on use cases and requirements", 3GPP TSG-RAN #97-e, RP-22xxxx, Agenda: 9.1, Nokia, Sep. 12-16, 2022, 5 pages.

Li et al., "A Cell Specific Reference Signal Interference Cancellation Scheme for LTE Cellular Access Systems", IEEE International Symposium on Broadband Multimedia Systems and Broadcasting, Jun. 17-19, 2015, pp. 1-6.

"Passive IoT", Nokia Bell Labs, 2021, pp. 1-9.

Ciftler et al., "IoT Localization for Bistatic Passive UHF RFID Systems with 3D Radiation Pattern", IEEE Internet of Things Journal, vol. 04, No. 04, Aug. 2017, pp. 1-12.

Kapucu et al., "Base-Station Design for Passive UHF RFID Tags with Pulse-Width Modulated Backscattering", 10th Conference on Ph.D. Research in Microelectronics and Electronics (PRIME), Jun. 30-Jul. 3, 2014, 4 pages.

Notice of Allowance received for corresponding Europe Application No. 22201301.3, dated Feb. 16, 2026, 6 pages.

* cited by examiner

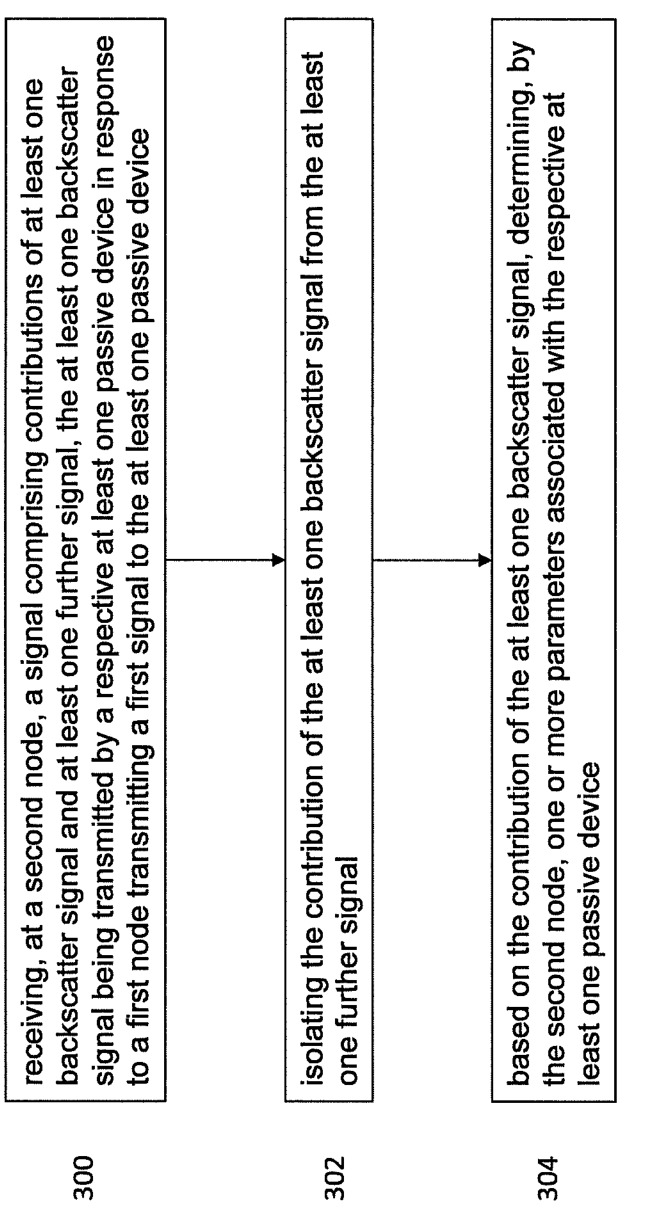
300
receiving, at a second node, a signal comprising contributions of at least one backscatter signal and at least one further signal, the at least one backscatter signal being transmitted by a respective at least one passive device in response to a first node transmitting a first signal to the at least one passive device
302
isolating the contribution of the at least one backscatter signal from the at least one further signal
304
based on the contribution of the at least one backscatter signal, determining, by the second node, one or more parameters associated with the respective at least one passive device
Fig. 3

METHOD, APPARATUS AND COMPUTER PROGRAM

FIELD

The present application relates to a method, apparatus, system and computer program and in particular but not exclusively to determining parameters associated with a passive device.

BACKGROUND

Backscatter signals may be used for communications with a passive device (such as a passive Internet of Things (IoT) device). Such signals can be used, for example, to obtain an identifier of a passive device. There remains a need for further developments in this field.

SUMMARY

According to an aspect, there is provided an apparatus comprising means for: receiving, at a second node, a signal comprising contributions of at least one backscatter signal and at least one further signal, the at least one backscatter signal being transmitted by a respective at least one passive device in response to a first node transmitting a first signal to the at least one passive device; isolating the contribution of the at least one backscatter signal from the at least one further signal; and based on the contribution of the at least one backscatter signal, determining, by the second node, one or more parameters associated with the respective at least one passive device.

The at least one further signal may comprise the first signal.

The isolating may comprise: demodulating the received signal; based on the demodulating, regenerating the first signal as transmitted; estimating a channel response based on the regenerated first signal as transmitted; reconstructing the first signal as received based on the regenerated first signal as transmitted and the estimated channel response; and removing the reconstructed first signal as received from the received signal to produce a remaining signal comprising the contribution of the at least one backscatter signal.

The at least one further signal may further comprise a contribution of at least one additional signal, and the isolating may comprise isolating the contribution of the at least one backscatter signal from the contribution of the first signal and the contribution of the at least one additional signal.

The isolating may comprise: demodulating the received signal; based on the demodulating, regenerating the first signal as transmitted and the at least one additional signal as transmitted; estimating a first channel response based on the regenerated first signal as transmitted; estimating a second channel response based on the regenerated at least one additional signal as transmitted; reconstructing the first signal as received based on the regenerated first signal as transmitted and the estimated first channel response; reconstructing the at least one additional signal as received based on the regenerated at least one additional signal as transmitted and the estimated second channel response; and removing the reconstructed first signal as received and the reconstructed at least one additional signal as received from the received signal to produce a remaining signal comprising the contribution of the at least one backscatter signal.

Determining the one or more parameters may comprise: processing the remaining signal with parameters associated with the at least one backscatter signal to produce a processed signal; generating at least one locally generated backscatter signal associated with the at least one passive device; and detecting the at least one passive device based on the processed signal and the at least one locally generated backscatter signal.

Generating the at least one locally generated backscatter signal may comprise: receiving, from a control node, one or more parameters associated with the at least one backscatter signal; and generating the at least one locally generated backscatter signal based on the received one or more parameters and the first signal.

Detecting the at least one passive device may comprise at least one of: performing cross-correlation with the at least one locally generated backscatter signal and the processed signal, and performing envelope detection on the resulting signal to detect the at least one passive device; or performing a frequency domain transformation of the at least one locally generated backscatter signal and the processed signal, multiplying the resulting frequency responses, and performing zero-forcing or minimum mean square error detection to detect the at least one passive device.

The means may be for: in response to detecting a first passive device, removing the locally generated backscatter signal associated with the first passive device from the processed signal to generate a remaining processed signal; and detecting at least one further passive device based on the remaining processed signal and the at least one locally generated backscatter signal.

The means may be for: determining the presence of the at least one passive device based on the one or more parameters.

The means may be for: responsive to determining the presence of the at least one passive device, providing, to a control node, an indication of the presence of the at least one passive device.

The first node may be one of a base station or a mobile device, and wherein the second node may be one of a base station or a mobile device.

The one or parameters may comprise at least one of: information identifying the at least one passive device; sensory information obtained by one or more sensors in communication with the at least one passive device; timing information relating to a difference between the time of transmission of the first signal by the first node and a time of arrival of the at least one backscatter signal from the respective at least one passive device; and a received power of the at least one backscatter signal.

According to an aspect, there is provided an apparatus comprising at least one processor and at least one memory storing instructions that, when executed by the at least one processor, cause the apparatus at least to: receive, at a second node, a signal comprising contributions of at least one backscatter signal and at least one further signal, the at least one backscatter signal being transmitted by a respective at least one passive device in response to a first node transmitting a first signal to the at least one passive device; isolate the contribution of the at least one backscatter signal from the at least one further signal; and based on the contribution of the at least one backscatter signal, determine, by the second node, one or more parameters associated with the respective at least one passive device.

The at least one further signal may comprise the first signal.

The instructions, when executed by the at least one processor, may cause the apparatus to: demodulate the received signal; based on the demodulating, regenerate the first signal as transmitted; estimate a channel response based on the regenerated first signal as transmitted; reconstruct the first signal as received based on the regenerated first signal as transmitted and the estimated channel response; and remove the reconstructed first signal as received from the received signal to produce a remaining signal comprising the contribution of the at least one backscatter signal.

The at least one further signal may further comprise a contribution of at least one additional signal, and the instructions, when executed by the at least one processor, may cause the apparatus to isolate the contribution of the at least one backscatter signal from the contribution of the first signal and the contribution of the at least one additional signal.

The instructions, when executed by the at least one processor, may cause the apparatus to: demodulate the received signal; based on the demodulating, regenerate the first signal as transmitted and the at least one additional signal as transmitted; estimate a first channel response based on the regenerated first signal as transmitted; estimate a second channel response based on the regenerated at least one additional signal as transmitted; reconstruct the first signal as received based on the regenerated first signal as transmitted and the estimated first channel response; reconstruct the at least one additional signal as received based on the regenerated at least one additional signal as transmitted and the estimated second channel response; and remove the reconstructed first signal as received and the reconstructed at least one additional signal as received from the received signal to produce a remaining signal comprising the contribution of the at least one backscatter signal.

The instructions, when executed by the at least one processor, may cause the apparatus to: process the remaining signal with parameters associated with the at least one backscatter signal to produce a processed signal; generate at least one locally generated backscatter signal associated with the at least one passive device; and detect the at least one passive device based on the processed signal and the at least one locally generated backscatter signal.

The instructions, when executed by the at least one processor, may cause the apparatus to: receive, from a control node, one or more parameters associated with the at least one backscatter signal; and generate the at least one locally generated backscatter signal based on the received one or more parameters and the first signal.

The instructions, when executed by the at least one processor, may cause the apparatus to: perform cross-correlation with the at least one locally generated backscatter signal and the processed signal, and perform envelope detection on the resulting signal to detect the at least one passive device; and/or perform a frequency domain transformation of the at least one locally generated backscatter signal and the processed signal, multiply the resulting frequency responses, and perform zero-forcing or minimum mean square error detection to detect the at least one passive device.

The instructions, when executed by the at least one processor, may cause the apparatus to, in response to detecting a first passive device, remove the locally generated backscatter signal associated with the first passive device from the processed signal to generate a remaining processed signal; and detect at least one further passive device based on the remaining processed signal and the at least one locally generated backscatter signal.

The instructions, when executed by the at least one processor, may cause the apparatus to: determine the presence of the at least one passive device based on the one or more parameters.

The instructions, when executed by the at least one processor, may cause the apparatus to, responsive to determining the presence of the at least one passive device, provide, to a control node, an indication of the presence of the at least one passive device.

The first node may be one of a base station or a mobile device, and wherein the second node may be one of a base station or a mobile device.

The one or parameters may comprise at least one of: information identifying the at least one passive device; sensory information obtained by one or more sensors in communication with the at least one passive device; timing information relating to a difference between the time of transmission of the first signal by the first node and a time of arrival of the at least one backscatter signal from the respective at least one passive device; and a received power of the at least one backscatter signal.

According to an aspect, there is provided a method comprising: receiving, at a second node, a signal comprising contributions of at least one backscatter signal and at least one further signal, the at least one backscatter signal being transmitted by a respective at least one passive device in response to a first node transmitting a first signal to the at least one passive device; isolating the contribution of the at least one backscatter signal from the at least one further signal; and based on the contribution of the at least one backscatter signal, determining, by the second node, one or more parameters associated with the respective at least one passive device.

The at least one further signal may comprise the first signal.

The isolating may comprise: demodulating the received signal; based on the demodulating, regenerating the first signal as transmitted; estimating a channel response based on the regenerated first signal as transmitted; reconstructing the first signal as received based on the regenerated first signal as transmitted and the estimated channel response; and removing the reconstructed first signal as received from the received signal to produce a remaining signal comprising the contribution of the at least one backscatter signal.

The at least one further signal may further comprise a contribution of at least one additional signal, and the isolating may comprise isolating the contribution of the at least one backscatter signal from the contribution of the first signal and the contribution of the at least one additional signal.

The isolating may comprise: demodulating the received signal; based on the demodulating, regenerating the first signal as transmitted and the at least one additional signal as transmitted; estimating a first channel response based on the regenerated first signal as transmitted; estimating a second channel response based on the regenerated at least one additional signal as transmitted; reconstructing the first signal as received based on the regenerated first signal as transmitted and the estimated first channel response; reconstructing the at least one additional signal as received based on the regenerated at least one additional signal as transmitted and the estimated second channel response; and removing the reconstructed first signal as received and the reconstructed at least one additional signal as received from the received signal to produce a remaining signal comprising the contribution of the at least one backscatter signal.

Determining the one or more parameters may comprise: processing the remaining signal with parameters associated with the at least one backscatter signal to produce a processed signal; generating at least one locally generated backscatter signal associated with the at least one passive device; and detecting the at least one passive device based on the processed signal and the at least one locally generated backscatter signal.

Generating the at least one locally generated backscatter signal may comprise: receiving, from a control node, one or more parameters associated with the at least one backscatter signal; and generating the at least one locally generated backscatter signal based on the received one or more parameters and the first signal.

Detecting the at least one passive device may comprise at least one of: performing cross-correlation with the at least one locally generated backscatter signal and the processed signal, and performing envelope detection on the resulting signal to detect the at least one passive device; or performing a frequency domain transformation of the at least one locally generated backscatter signal and the processed signal, multiplying the resulting frequency responses, and performing zero-forcing or minimum mean square error detection to detect the at least one passive device.

The method may comprise: in response to detecting a first passive device, removing the locally generated backscatter signal associated with the first passive device from the processed signal to generate a remaining processed signal; and detecting at least one further passive device based on the remaining processed signal and the at least one locally generated backscatter signal.

The method may comprise: determining the presence of the at least one passive device based on the one or more parameters.

The method may comprise: responsive to determining the presence of the at least one passive device, providing, to a control node, an indication of the presence of the at least one passive device.

The first node may be one of a base station or a mobile device, and wherein the second node may be one of a base station or a mobile device.

The one or parameters may comprise at least one of: information identifying the at least one passive device; sensory information obtained by one or more sensors in communication with the at least one passive device; timing information relating to a difference between the time of transmission of the first signal by the first node and a time of arrival of the at least one backscatter signal from the respective at least one passive device; and a received power of the at least one backscatter signal.

According to an aspect, there is provided a computer readable medium comprising instructions which, when executed by an apparatus, cause the apparatus to perform at least the following: receiving, at a second node, a signal comprising contributions of at least one backscatter signal and at least one further signal, the at least one backscatter signal being transmitted by a respective at least one passive device in response to a first node transmitting a first signal to the at least one passive device; isolating the contribution of the at least one backscatter signal from the at least one further signal; and based on the contribution of the at least one backscatter signal, determining, by the second node, one or more parameters associated with the respective at least one passive device.

The at least one further signal may comprise the first signal.

The isolating may comprise: demodulating the received signal; based on the demodulating, regenerating the first signal as transmitted; estimating a channel response based on the regenerated first signal as transmitted; reconstructing the first signal as received based on the regenerated first signal as transmitted and the estimated channel response; and removing the reconstructed first signal as received from the received signal to produce a remaining signal comprising the contribution of the at least one backscatter signal.

The at least one further signal may further comprise a contribution of at least one additional signal, and the isolating may comprise isolating the contribution of the at least one backscatter signal from the contribution of the first signal and the contribution of the at least one additional signal.

The isolating may comprise: demodulating the received signal; based on the demodulating, regenerating the first signal as transmitted and the at least one additional signal as transmitted; estimating a first channel response based on the regenerated first signal as transmitted; estimating a second channel response based on the regenerated at least one additional signal as transmitted; reconstructing the first signal as received based on the regenerated first signal as transmitted and the estimated first channel response; reconstructing the at least one additional signal as received based on the regenerated at least one additional signal as transmitted and the estimated second channel response; and removing the reconstructed first signal as received and the reconstructed at least one additional signal as received from the received signal to produce a remaining signal comprising the contribution of the at least one backscatter signal.

Determining the one or more parameters may comprise: processing the remaining signal with parameters associated with the at least one backscatter signal to produce a processed signal; generating at least one locally generated backscatter signal associated with the at least one passive device; and detecting the at least one passive device based on the processed signal and the at least one locally generated backscatter signal.

Generating the at least one locally generated backscatter signal may comprise: receiving, from a control node, one or more parameters associated with the at least one backscatter signal; and generating the at least one locally generated backscatter signal based on the received one or more parameters and the first signal.

Detecting the at least one passive device may comprise at least one of: performing cross-correlation with the at least one locally generated backscatter signal and the processed signal, and performing envelope detection on the resulting signal to detect the at least one passive device; or performing a frequency domain transformation of the at least one locally generated backscatter signal and the processed signal, multiplying the resulting frequency responses, and performing zero-forcing or minimum mean square error detection to detect the at least one passive device.

The instructions, when executed by the apparatus, may cause the apparatus to further perform: in response to detecting a first passive device, removing the locally generated backscatter signal associated with the first passive device from the processed signal to generate a remaining processed signal; and detecting at least one further passive device based on the remaining processed signal and the at least one locally generated backscatter signal.

The instructions, when executed by the apparatus, may cause the apparatus to further perform: determining the presence of the at least one passive device based on the one or more parameters.

The instructions, when executed by the apparatus, may cause the apparatus to further perform: responsive to determining the presence of the at least one passive device, providing, to a control node, an indication of the presence of the at least one passive device.

The first node may be one of a base station or a mobile device, and wherein the second node may be one of a base station or a mobile device.

The one or parameters may comprise at least one of: information identifying the at least one passive device; sensory information obtained by one or more sensors in communication with the at least one passive device; timing information relating to a difference between the time of transmission of the first signal by the first node and a time of arrival of the at least one backscatter signal from the respective at least one passive device; and a received power of the at least one backscatter signal.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 3 shows a method according to some examples; and

DETAILED DESCRIPTION

Figure 1:
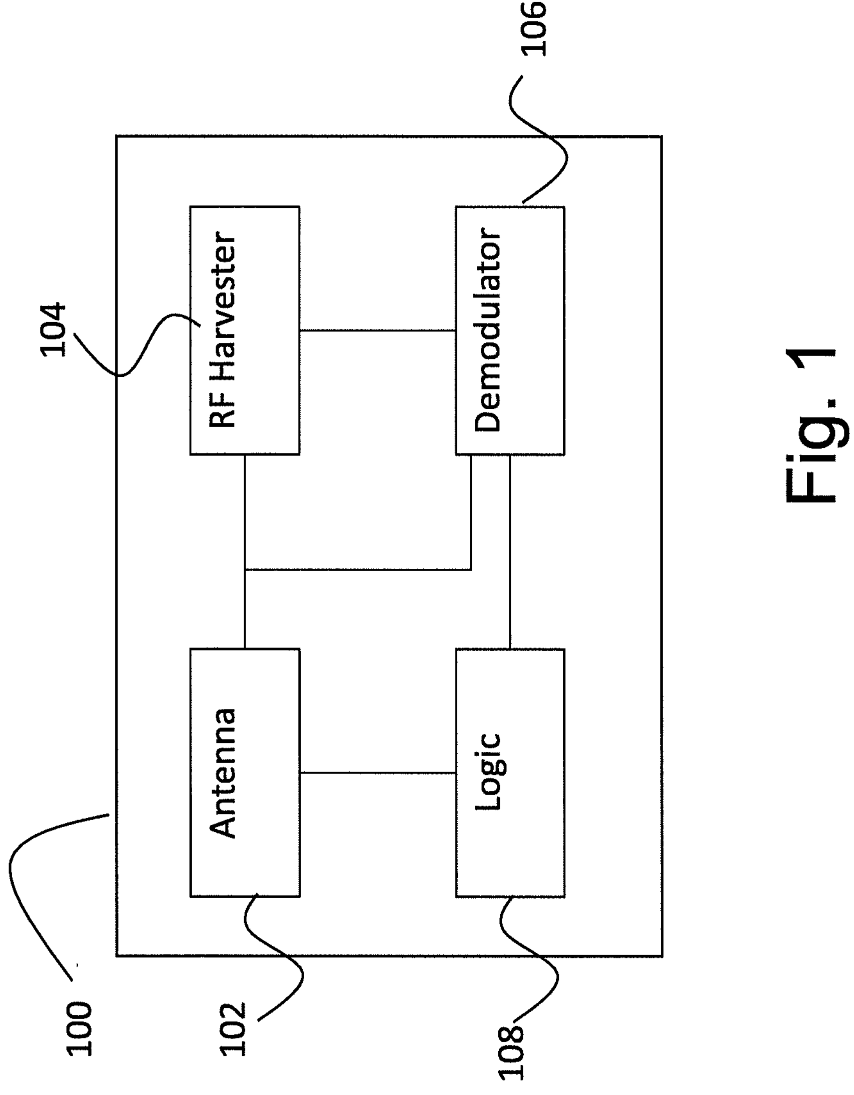
FIG. 1 shows an example passive device.

The scope of protection sought for various embodiments of the disclosure is set out by the independent claims. The embodiments and features, if any, described in the specification that do not fall under the scope of the independent claims are to be interpreted as examples useful for understanding various embodiments of the disclosure.

In the description and drawings, like reference numerals refer to like elements throughout.

The number of Internet of Things (IoT) connections is growing and, on some predictions, may be of the order of hundreds of billions by 2030. With more and more 'things' expected to be interconnected for purposes such as improving production efficiency and increasing comforts of life, further reduction of size, cost and power consumption for IoT devices are desired. In particular, regular replacement of batteries for many IoT devices may be impractical due to the consumption of materials and manpower. One option is to use energy harvested from environments to power IoT devices for self-sustainable communications, especially in applications having a very large number of devices (such as ID tags and sensors).

Existing IoT devices often consume of the order of tens or hundreds of milliwatts of power during transceiver operations. However, to achieve the so-called "Internet of Everything", IoT devices with significantly lower power consumption may be needed, especially for applications incorporating batteryless devices.

IoT devices may communicate using 3GPP technologies or non-3GPP technologies, as discussed further below.

An issue with existing 3GPP technologies for some use cases is the capability of cooperating with energy harvesting devices, considering limited device size. Cellular devices may consume tens or even hundreds of milliwatts power for transceiver processing. Taking narrowband IoT (NB-IoT) modules for example, an example current absorption for receive processing may be of the order of 60 mA with supply voltage higher than 3.1V, while 70 mA may be needed for transmitting processing at 0 dBm transmit power. The output power provided by an example energy harvester may be less than 1 milliwatt, based on a device size of a few square centimetres. Since the available power may be less than the consumed power, it may be impractical to power cellular devices directly by energy harvesting in many cases.

One possible solution is to integrate energy harvesting with a rechargeable battery or supercapacitor. However, this raises further issues, some of which are outlined below.

First, both rechargeable batteries and supercapacitors may suffer from shortened lifetime in practical cases. It may be hard to provide constant charging current or voltage by energy harvesting, while long-time continuous charging may be needed due to the very small output power from an energy harvester. Variable charging current levels and extended continuous charging periods both tend to be harmful to battery life. For supercapacitors, lifetime may also be reduced in high temperature environments (e.g., less than 3 years at 50 degrees centigrade).

Second, device size may be significantly increased if a battery or supercapacitor is needed. As a small size button battery can provide current of a few tens of milliamps, a battery with much larger size (e.g., AA battery) may be needed to power cellular devices—such batteries may even be larger than the module itself. To store energy for a useful duration of working (such as one second), the needed capacitance of a supercapacitor may be of the order of 100 mF. The size of such supercapacitors may be larger than an NB-IoT module.

Third, both rechargeable batteries and supercapacitors can be more expensive than the module itself. Even purchased in large quantities, the cost of a suitable battery or supercapacitor may reach one or a few dollars, which might double the overall cost of devices.

Regarding non-3GPP technologies, RFID may be used for supporting batteryless tags/devices. The power consumption of commercial passive RFID tags can be as low as 1 microwatt. Techniques that help to enable such low power consumption are envelope detection for downlink data reception, and backscatter communication for uplink data transmission. RFID is designed for short-range communications, whose effective range may be less than 10 meters.

An example passive device 100 is shown in FIG. 1. The example passive device 100 may comprise an antenna 102, RF harvester 104, demodulator 106, and logic unit 108.

Figure 2:
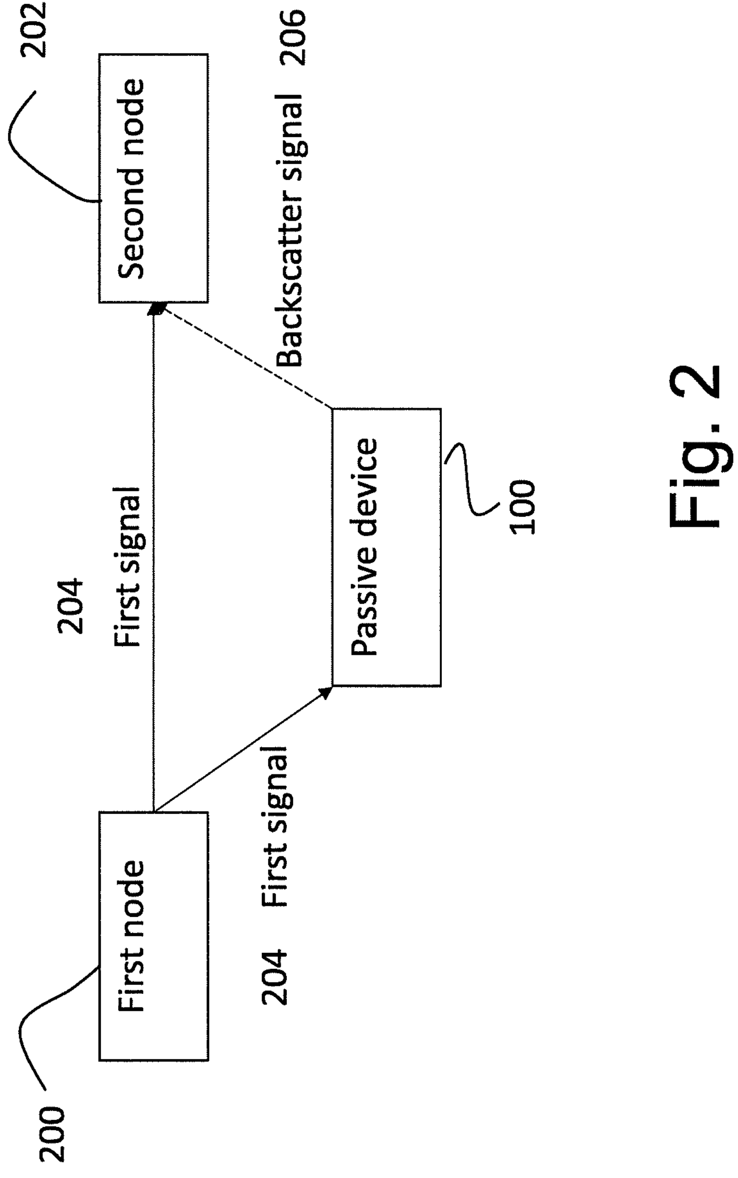
FIG. 2 shows an example system comprising a first node, second node, and passive device.

An example system comprising a first node 200, second node 202, and passive device 100 is shown in FIG. 2.

The first node 200, such as a user equipment or base station, may act as an activator for the passive device 100. The first node may transmit a first signal 204. The first signal 204 may comprise an activation signal embedded in the first signal.

The passive device 100 may receive the first signal 204 via the antenna 102, demodulate the received first signal 204 at the demodulator 106, and extract the activation signal from the first signal. The RF harvester 104 may extract power from the first signal 204. The passive device may generate and transmit a backscatter signal 206 using the extracted power via the antenna 102. Logic unit 108 may control the operation of the antenna 102 and demodulator 106. The backscatter signal may comprise information identifying the passive device.

The second node 202, such as a further user equipment or further base station, may receive a signal comprising contributions of the backscatter signal 206 from the passive device 100, and the first signal 204.

The second node may determine one or more parameters based on the received signal. The one or more parameters may comprise the information identifying the passive device.

To support and integrate passive IoT in 5G NR network infrastructure and beyond, the network may need to identify the coarse location of the passive device. However, this may be challenging, as there may be no active elements on the passive device and thus no means for the passive device to make itself visible or heard.

Discovering a passive device may be a challenging task due to the inherent nature of the passive radio. More precisely, the passive device may not have a power source, may be mobile, and may hear other radios only in its own proximity (for example a 60 m radius).

In addition, when multiple passive devices are located in relatively close proximity, multiple devices may be triggered by a same first signal. It may be challenging for a receiving device to identify each passive device from a signal comprising contributions of multiple backscatter signals and further signals, such as the first signal, reflections, interfering signals etc.

Furthermore, the mobility and operation of the passive device (i.e. how much data has collected) may be transparent to the network. Because of the above limitations, the network may not be able to apply some UE paging operations. As such, alternative procedures may be defined.

Reference is made to FIG. 3, which shows a method according to some examples.

At 300, the method comprises receiving, at a second node, a signal comprising contributions of at least one backscatter signal and at least one further signal, the at least one backscatter signal being transmitted by a respective at least one passive device in response to a first node transmitting a first signal to the at least one passive device.

At 302, the method comprises isolating the contribution of the at least one backscatter signal from the at least one further signal. In some examples, the isolating may be based on the first signal.

At 304, the method comprises, based on the contribution of the at least one backscatter signal, determining, by the second node, one or more parameters associated with the respective at least one passive device.

As explained above, the network may discover the passive device when the passive device receives an activation signal with sufficient energy so that:

a. The passive device can charge sufficiently and b. The passive device can generate response which has sufficient energy to be heard by another nearby network element (such as a gNB, RSU, UE, etc.).

As explained above, in some examples a first node, such as a user equipment or base station, may act as a passive device activator, and a second node, such as a further user equipment or further base station, may act as a passive device discoverer. A control node may configure the first node and/or the second node for performing passive device discovery.

The second node may receive, from the control node, information for performing tag discovery. The control node may for example be a network function, such as but not limited to a location management function (LMF).

The information may comprise at least one of:

- one or more parameters of an activation signal associated with the passive device;
- an ID of the passive device; and
- one or more parameters of the NR physical channel over which the passive device signal is overlayed (for example MCS of the signal sent by the first node to activate the passive device).

In some examples the NR physical channel may comprise at least one of:

- an intended signal (i.e., a DL signal from serving cell, a SL signal from a peer node intended for the second node);
- a relayed signal (i.e., a DL/UL/SL signal that the second node needs to relay);
- a neighbor node's signal (i.e. a DL/UL/SL signal that the second node overhears but the payload of which is intended for another node); and
- a combination of the above in case the gNB has detected cross link or co-channel interference.

The second node may use the received information to perform passive device discovery. For example, the second node may use the one or more parameters of an activation signal associated with the passive device and/or the ID of the passive device to regenerate locally the backscatter signal from the passive device. The second node may also use the one or more parameters of the NR physical channel over which the passive device signal is overlayed to reconstruct an ideal signal i.e., free of interference.

However, the first signal and the backscatter signal may have different properties, for example different waveforms (single or multicarrier waveform), different sampling rates, different spectral emission behaviour etc.

To be able to cope with the dissimilarities between the waves required for a successful passive device detection, some examples may implement processing, such as waveform matching (e.g. by upsampling, filtering, or other projection operation to transform the signal), between the first signal and the backscatter signal, followed by pattern analysis of the combined signals.

Figure 4:
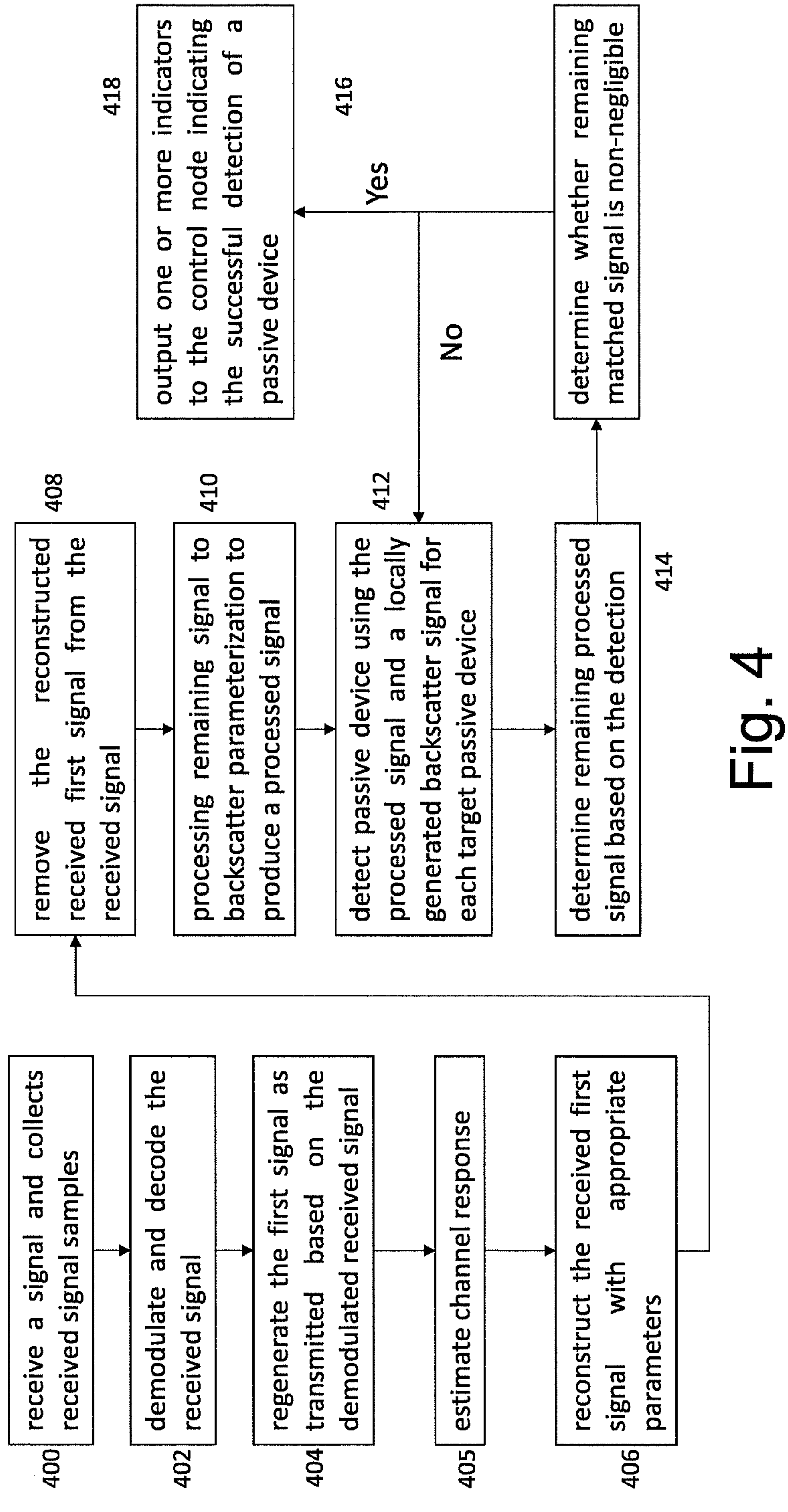
FIG. 4 shows a method according to some examples.

Reference is made to FIG. 4, which shows a method according to some examples.

At 400, the second node receives a signal. The received signal may comprise contributions of at least one backscatter signal and at least one further signal. For example, the received signal may comprise a combination of the first signal(s) transmitted by the first node and the backscatter signal transmitted by the passive device.

The second node may sample the received signal. In some examples the second node may sample the signal with a sampling rate 1/Ts, where Ts represents the sampling rate of the system, which in some examples may be inversely proportional to the signal bandwidth. The resulting signal vector may contain at least contributions of backscatter signals from one or more responsive target passive devices and contributions of at least one further signal, such as the first signal, each of which may be modified by the respective propagation channels. The contribution of the signals may be localized in frequency domain i.e., the activation and/or backscatter signals may use only a subset of PRBs of the total signal.

The second node may then isolate the contribution of the backscatter signal from the contribution of the at least one further signal. In some examples, the isolating may be based on the first signal.

For example, as shown at 402, the second node may demodulate and decode the received signal. For example, the second node may estimate the NR channel response and decode the backscatter signal and further signal from the received signal.

At 404, the second node may regenerate the further signal as transmitted.

For example, to regenerate the further signal, the second node may re-encode and remodulate the recently decoded data, or only remodulate the samples (e.g., if the RE corresponds to a pilot symbol).

At 405, the second node may reconstruct/estimate the channel response of the channel over which the at least one further signal is transmitted based on the regenerated further signal as transmitted.

At 406, based on the regenerated further signal as transmitted determined at 404 and the estimated channel response determined at 405, the second node may reconstruct the received further signal. The reconstructed received further signal may be reconstructed with appropriate parameters (e.g. sampling rate, FFT size etc).

At 408, the second node may remove the reconstructed received further signal from the received signal.

Thus, after step 408, the further signal(s), such as the first signal transmitted by the first node, may be removed from the signal received at the second node. Thus, the remaining signal should comprise the contribution of the backscatter signal(s) but not the further signal(s). That is to say, the contribution of the backscatter signal(s) may be isolated from the contribution of the further signal(s). In some examples, the isolating may be based on the first signal.

It should be understood than, in some examples, different method(s) for isolating the contribution of the backscatter signal from the contribution of the at least one further signal may be used.

For example, the second node may resample the received signal at a sampling rate corresponding to the sampling rate of the backscatter signal. The resampled received signal samples may be assumed to comprise the backscatter signal(s) and an interference contribution generated by other signal(s). The mean and variance of the interference contribution may then be calculated by assuming a given probability density function for the interference signal. The result of the calculation may then be used in combination with an linear (e.g. MMSE) estimator applied to the received signal to detect (i.e. isolate) the backscatter signal. The calculating step may be repeated and the result used with the MMSE estimator iteratively until convergence has been achieved e.g. the variance from the calculating step is stable between two consecutive updates.

At 410, the remaining signal may be subsequently processed with parameters associated with the backscatter parameterization to produce a processed signal. The processed signal parameters may differ at least in part from the remaining signal parameters. Examples of parameter include, but are not limited to: sampling resolution, bandwidth, waveform type, etc. The processing may comprise wave-matching, where a set of processing operations may be applied on the received signal samples. The operations may transform the received signal characterized by a set of parameters (e.g. a given BW, resolution), into a signal characterized by a second set of parameters (e.g. a target BW, resolution). Wave-matching may comprise any of the following operations: resampling/upsampling/downsampling, pruning, filtering That is to say, in some examples the remaining signal may be remodulated, resampled, re-filtered etc. to match to the backscatterers' waveforms.

In some examples, after the processing, some parts of the processed signal may be retained for further processing and the remaining parts may be discarded. For example, a selected BWP or set of RE, etc. may be retained and the remaining BWP or RE may be discarded.

At 412, using the processed signal from 410, the second node may attempt to detect a target passive device.

In some examples, the second node may use the processed signal and a locally generated backscatter signal for the target passive device to attempt to detect the target passive device.

In some examples where there are multiple target passive devices, the second node may locally generate multiple backscatter signals corresponding to the multiple target passive devices and use the processed signal and the locally generated backscatter signals for the multiple target devices to attempt to detect the multiple passive devices.

As explained above, the second node may use the one or more parameters of an activation signal associated with the passive device and/or the ID of the passive device to regenerate locally the backscatter signal from the passive device.

In some examples, the second node may locally generate the backscatter signal samples. For example the second node may locally generate the backscatter signal samples s (from passive device j with resolution $T \neq T_s$ according to the signalled parameterization, for example:

$$s(k, j) = f(a(kT), j)$$

Where s(k,j) represents the k-th sample for device j, and f( ) is a known function modulating the activation signal a(t).

In some examples, the second node may perform cross-correlation with the locally generated backscatter signal(s) and the processed signal, and perform envelope detection on the resulting signal to detect the passive device(s).

In other examples, the second node may perform a frequency domain transformation of the locally generated backscatter signal(s) and the processed signal and multiply the resulting frequency responses, and then perform zero-forcing or minimum mean square error (MMSE) detection to detect the passive device(s).

The detection of multiple target passive devices may be performed in parallel (i.e. using the same signal and combining it with one or more locally generated backscatter signals corresponding to one or more passive devices, in parallel operations) or sequentially (i.e., when a passive device is detected, its contribution is removed from the total signal and the process repeated with the remaining signal).

In some examples, at 414, the second node may determine the remaining matched signal based on the detection at 412. For example, the second node may remove the backscatter signal associated with the detected passive device(s) from the processed signal to generate the remaining matched signal.

In some examples, at 416, the second node may determine whether the remaining matched signal is non-negligible.

That is to say, the second node may determine whether the total energy of the residual signal is above a certain threshold, for example −5 dB.

When the determination at 416 finds that the remaining signal is non-negligible, the second node may repeat steps 412 and 414 until the remaining processed signal is negligible.

When the determination at 416 finds that the remaining signal is negligible, the second node may output one or more indicators to the control node indicating the successful detection of a passive device. The control node may for example comprise a network node, such as but not limited to a gNB or location management function (LMF). The one or more indicators may comprise any suitable indication, for example a flag which is set when the passive device is detected and is not set when the passive device is not detected, or a field which has a value "1" when the passive device is detected and a value "0" when the passive device is not detected.

For example, when a relevant pattern is found at step 412 (e.g. a clear peak is detected if envelope detection is used), the second node may return an indicator (e.g. a flag) associated with the passive device ID and a measurement indicative of the quality of the detection (e.g. estimated backscatterer power).

In some examples, the contribution of the at least one further signal may comprise contributions from at least one additional signal, such as a useful signal and/or an interfering signal, in addition to the backscatter and activation signals.

In such cases, the second node may detect and remove the contribution of the at least one additional signal from the received signal in a similar manner to that described previously in relation to removing the contribution of the further signal. That is to say, in some examples the second node may regenerate the first signal as transmitted and the at least one additional signal as transmitted, estimate the associated channel responses based on the regenerated signals as transmitted, reconstruct the first signal as received and the at least one additional signal as received based on the regenerated first signal as transmitted and the at least one additional signal as transmitted and the estimated channel responses, and remove the reconstructed first signal as received and the reconstructed at least one additional signal as received from the received signal to leave the contribution of the backscatter signal. Using the remaining signal, the second node may proceed to perform processing, such as wave-matching, and passive device detection as described previously.

Thus in some examples, the second node may detect multiple passive devices overlayed over the same signal at no additional spectral efficiency cost.

In some examples, the first node may comprise one of a base station and a UE, and the second node may comprise one of a base station and a UE. That is to say, in some examples the first node may comprise a base station and the second node may comprise a UE; or the first node may comprise a base station and the second node may comprise a base station; or the first node may comprise a UE and the second node may comprise a UE; or the first node may comprise a UE and the second node may comprise a base station.

In some examples there is provided an apparatus comprising means for: receiving, at a second node, a signal comprising contributions of at least one backscatter signal and at least one further signal, the at least one backscatter signal being transmitted by a respective at least one passive device in response to a first node transmitting a first signal to the at least one passive device; isolating the contribution of the at least one backscatter signal from the at least one further signal; and based on the contribution of the at least one backscatter signal, determining, by the second node, one or more parameters associated with the respective at least one passive device.

In some examples the apparatus may comprise at least one processor and at least one memory storing instructions that, when executed by the at least one processor, cause the apparatus at least to: receive, at a second node, a signal comprising contributions of at least one backscatter signal and at least one further signal, the at least one backscatter signal being transmitted by a respective at least one passive device in response to a first node transmitting a first signal to the at least one passive device; isolate the contribution of the at least one backscatter signal from the at least one further signal; and based on the contribution of the at least one backscatter signal, determine, by the second node, one or more parameters associated with the respective at least one passive device.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

What is claimed is:

1. An apparatus, comprising:

at least one processor; and at least one non-transitory memory storing instructions that, when executed by the at least one processor, cause the apparatus to perform:

receiving, at a second node, a signal comprising contributions of at least one backscatter signal and at least one further signal, the at least one backscatter signal being transmitted by at least one passive device in response to a first node transmitting a first signal to the at least one passive device, wherein the at least one further signal comprises the first signal and at least one additional signal;

isolating the contribution of the at least one backscatter signal from the first signal and the at least one additional signal, wherein isolating comprises:

demodulating the received signal;

based on demodulating the received signal, regenerating the first signal as transmitted and the at least one additional signal as transmitted;

estimating a first channel response based on the regenerated first signal as transmitted;

estimating a second channel response based on the regenerated at least one additional signal as transmitted;

reconstructing the first signal as received based on the regenerated first signal as transmitted and the estimated first channel response;

reconstructing the at least one additional signal as received based on the regenerated at least one additional signal as transmitted and the estimated second channel response; and removing the reconstructed first signal as received and the reconstructed at least one additional signal as received from the received signal to produce a remaining signal comprising the contribution of the at least one backscatter signal; and based on the contribution of the at least one backscatter signal, determining, by the second node, one or more parameters associated with the at least one passive device.

2. The apparatus of claim 1, wherein the instructions, when executed by the at least one processor, further cause the apparatus to perform:

processing the remaining signal with one or more parameters associated with the at least one backscatter signal to produce a processed signal;

generating at least one locally generated backscatter signal associated with the at least one passive device; and detecting the at least one passive device based on the processed signal and the at least one locally generated backscatter signal.

3. The apparatus of claim 2, wherein the instructions, when executed by the at least one processor, further cause the apparatus to perform:

receiving, from a control node, the one or more parameters associated with the at least one backscatter signal; and generating the at least one locally generated backscatter signal based on the received one or more parameters and the first signal.

4. The apparatus of claim 2, wherein the instructions, when executed by the at least one processor, further cause the apparatus to perform at least one of:

performing cross-correlation between the at least one locally generated backscatter signal and the processed signal, and performing envelope detection on a resulting signal to detect the at least one passive device; or performing a frequency domain transformation of the at least one locally generated backscatter signal and the processed signal, multiplying resulting frequency responses, and performing zero-forcing or minimum mean square error detection to detect the at least one passive device.

5. The apparatus of claim 2, wherein the instructions, when executed by the at least one processor, further cause the apparatus to perform:

in response to detecting the at least one passive device, removing the locally generated backscatter signal associated with the at least one passive device from the processed signal to generate a remaining processed signal; and detecting at least one further passive device based on the remaining processed signal and the at least one locally generated backscatter signal.

6. The apparatus of claim 1, wherein the instructions, when executed by the at least one processor, cause the apparatus to perform:

determining a presence of the at least one passive device based on the one or more parameters associated with the at least one passive device.

7. The apparatus of claim 6, wherein the instructions, when executed by the at least one processor, cause the apparatus to perform:

responsive to determining the presence of the at least one passive device, providing, to a control node, an indication of the presence of the at least one passive device.

8. The apparatus of claim 1, wherein the first node is one of a base station or a mobile device, and wherein the second node is one of a base station or a mobile device.

9. The apparatus of claim 1, wherein the one or more parameters associated with the at least one passive device comprises at least one of:

information identifying the at least one passive device;

sensory information obtained from one or more sensors in communication with the at least one passive device;

timing information relating to a time difference between a transmission of the first signal from the first node and an arrival of the at least one backscatter signal from the at least one passive device; or a received power of the at least one backscatter signal.

10. A method, comprising:

receiving, at a second node, a signal comprising contributions of at least one backscatter signal and at least one further signal, the at least one backscatter signal being transmitted by a respective at least one passive device in response to a first node transmitting a first signal to the at least one passive device, wherein the at least one further signal comprises the first signal;

isolating the contribution of the at least one backscatter signal from the at least one further signal, wherein isolating comprises:

demodulating the received signal;

based on demodulating the received signal, regenerating the first signal as transmitted;

estimating a channel response based on the regenerated first signal as transmitted;

reconstructing the first signal as received based on the regenerated first signal as transmitted and the estimated channel response; and removing the reconstructed first signal as received from the received signal to produce a remaining signal comprising the contribution of the at least one backscatter signal; and based on the contribution of the at least one backscatter signal, determining, by the second node, one or more parameters associated with the at least one passive device.

11. A non-transitory computer-readable storage device readable by an apparatus, tangibly embodying a program of instructions that, when executed by the apparatus, cause the apparatus to perform:

receiving, at a second node, a signal comprising contributions of at least one backscatter signal and at least one further signal, the at least one backscatter signal being transmitted by a respective at least one passive device in response to a first node transmitting a first signal to the at least one passive device, wherein the at least one further signal comprises the first signal;

isolating the contribution of the at least one backscatter signal from the at least one further signal, wherein isolating comprises:

demodulating the received signal;

based on demodulating the received signal, regenerating the first signal as transmitted;

estimating a channel response based on the regenerated first signal as transmitted;

reconstructing the first signal as received based on the regenerated first signal as transmitted and the estimated channel response; and removing the reconstructed first signal as received from the received signal to produce a remaining signal comprising the contribution of the at least one backscatter signal; and based on the contribution of the at least one backscatter signal, determining, by the second node, one or more parameters associated with the at least one passive device.

* * * * *